United States Patent [19]

Rini et al.

[11] Patent Number: 5,121,324
[45] Date of Patent: Jun. 9, 1992

[54] MOTOR VEHICLE MAGAGEMENT AND CONTROL SYSTEM INCLUDING SOLENOID ACTUATED FUEL INJECTION TIMING CONTROL

[75] Inventors: Guy T. Rini; Oldrich S. Kolarik; James E. Marsden, all of Hagerstown, Md.; June M. Warner, Lovettsville, Va.; Ramin Younessi; Dolyn P. Ruffner, both of Hagerstown, Md.; Stephen W. Heffner, Chambersburg, Pa.

[73] Assignee: Mack Trucks, Inc., Allentown, Pa.

[21] Appl. No.: 454,269

[22] Filed: Dec. 21, 1989

[51] Int. Cl.⁵ .............. G06G 15/50; F02D 31/00; F02M 59/20
[52] U.S. Cl. ............... 364/431.05; 123/500; 123/349; 123/351; 364/426.04; 364/431.07
[58] Field of Search ........ 364/431.01, 431.03, 364/431.04, 431.05, 431.07, 424.1, 424.01, 426.04; 123/500–503, 357, 349, 350, 351

[56] References Cited

U.S. PATENT DOCUMENTS

| | | | |
|---|---|---|---|
| 3,603,112 | 9/1971 | Sola | 464/2 |
| 3,628,889 | 12/1971 | Kobayashi et al. | 123/502 |
| 3,815,564 | 6/1974 | Suda et al. | 123/502 |
| 3,934,430 | 1/1976 | Fuso | 123/502 X |
| 4,493,303 | 1/1985 | Thompson et al. | 123/357 |
| 4,586,480 | 5/1986 | Kobayashi et al. | 123/503 |
| 4,590,908 | 5/1986 | Yoshinaga et al. | 123/357 |
| 4,787,044 | 11/1988 | Nagata et al. | 364/431.07 |
| 4,809,177 | 2/1989 | Windle et al. | 364/424.01 |
| 4,852,011 | 7/1989 | Ueno | 364/431.07 |

Primary Examiner—Parshotam S. Lall
Assistant Examiner—E. J. Pipala
Attorney, Agent, or Firm—Rothwell, Figg Ernst & Kurz

[57] ABSTRACT

An electronic integrated engine and vehicle management and control system includes an electronic vehicle control module and a fuel injection control module, in communication with each other, which together control the total vehicle and engine operation functions of a heavy duty vehicle. A novel fuel injection timing device is utilized with the control module to allow precise and sophisticated control of engine timing based on a number of engine and vehicle operating parameters as determined by the control modules. Functions such as engine speed control, vehicle road speed control, engine protection shutdown, fuel economy, braking control and diagnostics are performed by the system.

8 Claims, 8 Drawing Sheets

MOTOR VEHICLE MAGAGEMENT AND CONTROL SYSTEM INCLUDING SOLENOID ACTUATED FUEL INJECTION TIMING CONTROL

BACKGROUND OF THE INVENTION

This invention relates generally to control systems for motor vehicles, and more particularly to integrated electronic motor vehicle management and control systems specifically useful in heavy duty vehicles such as trucks, in which various engine and vehicle functions such as engine timing and speed control, road speed control, vehicle safety functions, fuel exhaust emissions monitoring, fuel economy and diagnostic and maintenance functions are performed and monitored by an integrated microprocessor based control module system.

In the past, most engine and vehicle control functions in heavy duty vehicles were performed mechanically in response to very simple parameters such as engine speed. The execution of such functions was thus limited and optimization in terms of fuel economy, engine performance and engine emissions quantities was not possible. In addition, certain diagnostic and maintenance functions were left to human performance and thus such functions were not necessarily performed optimally or performed in a manner interrelated with the performance and parameters of other vehicle functions.

SUMMARY OF THE INVENTION

The present invention provides a management and control system for a motor vehicle in which engine speed and timing control and various vehicle functions such as engine system monitoring, display, diagnostics and maintenance are controlled by a microprocessor based electronic control module. The control system is further provided with programming capability for optimizing control functions with respect to particular vehicle parameters based on the type of vehicle within which the control system is installed, including such parameters as engine size and type, tire size and properties, and carrier ratio.

DETAILED DESCRIPTION OF THE PREFERRED EMBODIMENTS

Figure 1:
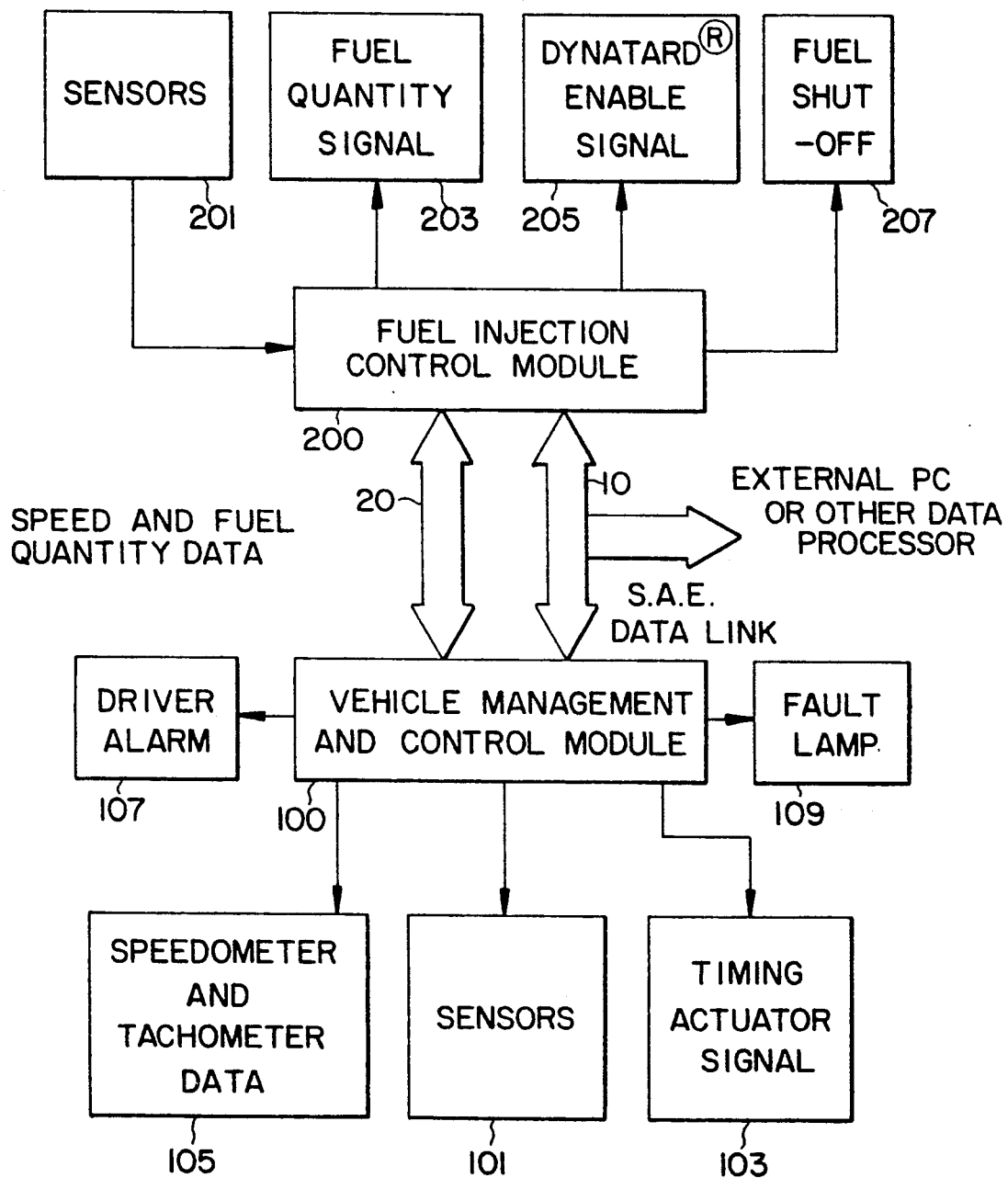
FIG. 1 is a block diagram of an electronic vehicle and engine management and control system according to one embodiment of the present invention.

FIG. 1 is a block diagram of an electronic control system for a heavy duty vehicle according to one preferred embodiment of the present invention. The system is based on two control modules, a vehicle management and control module 100 and a fuel injection module 200, interconnected by a serial data communication line 10 which conforms to standards set by the Society of Automotive Engineers (S.A.E.). The control modules 100 and 200 are also connected by a general data bus 20 through which data relating to engine speed and fuel quantity are transmitted. The serial data communication line 10 is also connectable to an external computer such as a personal computer or equivalent data processing device, which allows external programming and modification of data used in the performance of the various algorithms by the control modules.

Figure 2:
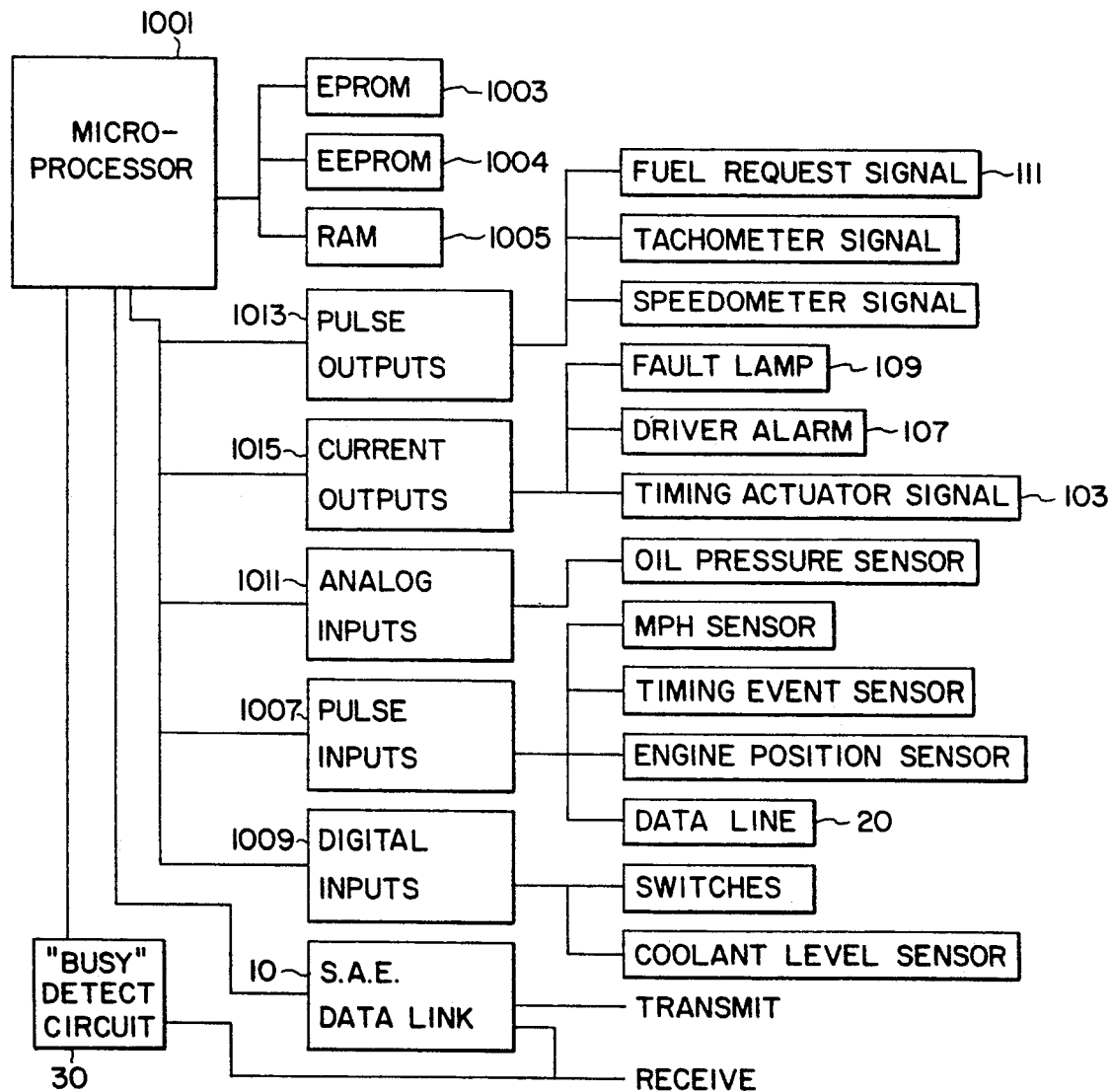
FIG. 2 is a detailed block diagram of the vehicle management and control module of FIG. 1.

The vehicle management control module 100 has inputs connected to a plurality of sensors 101 which will be further described in conjunction with FIG. 2. In response to the sensor signal inputs, the vehicle management control module 100 produces a fuel injection timing signal 103, speedometer and tachometer data signals 105, a signal to alert an operator of the vehicle of a fault condition by activating an audible or visual driver alarm 107, signals driving various fault lamps 109 to indicate a problem with data received by the control module 100, and appropriate data through communication lines 10 and 20 to the fuel injection control module 200 to coordinate proper fuel injection.

Figure 3:
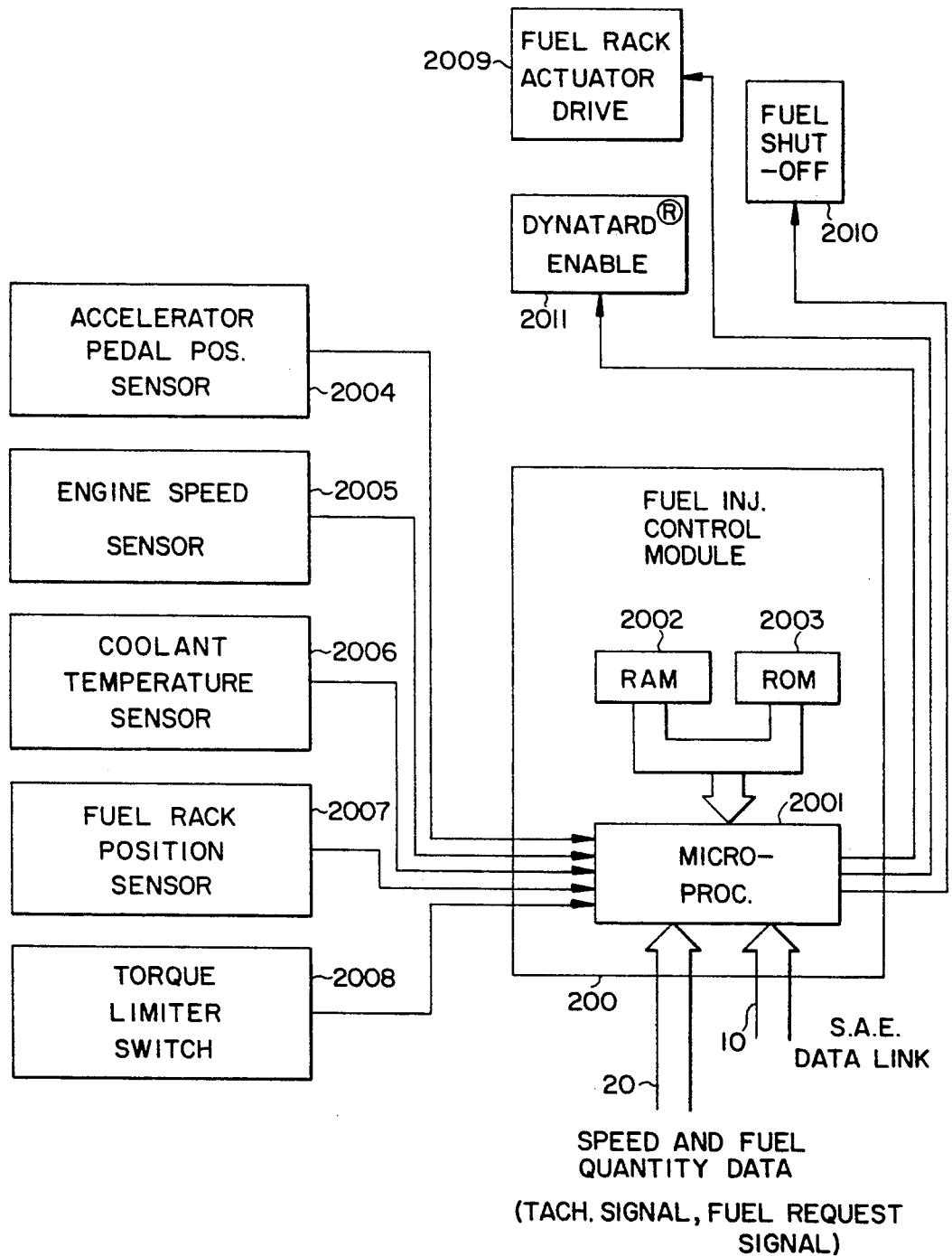
FIG. 3 is a detailed block diagram of the fuel injection control module of FIG. 1.

The fuel injection control module 200 has inputs connected to various sensors 201 to be described in further detail with reference to FIG. 3, and outputs a fuel quantity signal 203, a DYNATARD ® enable signal 205, and a fuel shut-off enable signal 207. The DYNATARD ® system converts the operation of the engine to an air compressor by opening the exhaust valves near the end of a compression stroke to increase engine braking. The DYNATARD ® system is activated by a dashboard toggle switch.

The operation of the vehicle management and control module 100 will be more clearly understood with reference to FIG. 2. The vehicle management and control module 100 is composed of a microprocessor 1001, a random access memory 1005, and an EPROM 1003, and an EEPROM 1004. The inputs to the microprocessor 1001 comprise a number of pulse width modulated (PWM) inputs 1007, a plurality of digital data inputs 1009, and a plurality of analog inputs 1011. The pulse inputs include a pulse signal from an mph sensor which is mounted near the vehicle's transmission output shaft so as to provide an electrical pulse each time one of the teeth of a tone wheel mounted on the transmission output shaft passes the tip of the sensor. The frequency of the mph sensor output pulses is proportional to the rotational velocity of the transmission output shaft. The road speed of the vehicle can thus be calculated by factoring the number of teeth on the tone wheel, the gear ratio between the transmission output shaft and the vehicle axle shaft, and the rolling circumference of the drive axle tires. These data values can be programmed into the module memory for each specific type of vehicle in which the system is installed. The timing event sensor is mounted proximate the fuel injection pump camshaft of the vehicle engine and generates a pulse when the fuel injection pump camshaft attains an angular position corresponding to port closure or beginning of fuel injection for a predetermined plunger of the injection pump. The engine position sensor is mounted proximate the engine crankshaft and generates a pulse when the crankshaft attains an angular position related to top dead center (TDC) of the corresponding piston of the cylinder to which the plunger is coupled, on its power stroke. The data line 20 is a pulse width modulation signal line which communicates engine speed and fuel quantity data to the microprocessor 1001 from the fuel injection control module 200.

The digital inputs comprise a plurality of switches including a clutch switch, an engine shutdown override switch, and speed control switches for cruise control, engine idle speed, and engine speed control for power take off (PTO) functions. A coolant level sensor is mounted within the radiator of the engine and provides a coolant level signal representing the amount of coolant in the coolant system.

The analog inputs include an oil pressure signal from an oil pressure sensor mounted within the vehicle crankcase to measure the oil pressure of the system.

A coolant temperature sensor is also provided in the coolant system and transmits a serial data signal to the microprocessor over the SAE data link 10.

The microprocessor also includes a plurality of PWM outputs 1013 and dc current outputs 1015. The pulse outputs 1013 include a fuel request signal which is transmitted to the fuel injection control module 200, and tachometer and speedometer signals which are transmitted to display devices on the vehicle dashboard. The tachometer signal is also inputted to the fuel injection control module 200 through the data line 20 to provide a redundant signal to the fuel injection control module which is used in the calculation of the amount of fuel to be injected by the fuel pump.

The current outputs 1015 include outputs to drive a fault lamp 109 to indicate the presence of a fault in the control module, a driver alarm 107 which warns the driver of a problem with the operation of the engine which requires immediate attention, and a timing actuator signal 103 which is applied to the fuel injection pump to control the timing of fuel injection into the cylinders of the engine.

The fuel injection control module 200 is further described with reference to FIG. 3. The fuel injection control module 200 is a commercially available device obtainable from Robert Bosch, for example. The control module is a microprocessor based system and includes basic functional components including a microprocessor 2001, and random access and read only memories 2002 and 2003. The microprocessor is connected via interfaces to the SAE serial data communication link 10 and the data line 20 to enable communication with the vehicle management and control module 100 as well as to other various control devices in the vehicle. The control module 200 reads input signals from an accelerator pedal position sensor 2004, an engine speed sensor 2005, a coolant temperature sensor 2006, a fuel rack position sensor 2007, and a torque limiter switch 2008. The accelerator pedal position sensor includes a potentiometer connected to the accelerator pedal in the vehicle cab and provides a voltage signal proportional to the position of the acceleration pedal relative to the floor of the vehicle cab. The engine speed sensor is mounted proximate the engine crankshaft and generates a pulse signal whose frequency is proportional to the speed of rotation of the engine crankshaft. The coolant temperature sensor 2006 provides a digital signal representative of engine coolant temperature. The fuel rack position sensor 2007 provides a voltage signal proportional to the position of the fuel rack of the fuel injection pump, which relates to the amount of fuel injected during each cycle of engine rotation. The torque limiter switch 2008 is a transmission mounted toggle switch which is activated by the vehicle operator. In response to the five input parameters, and supplemental speed and fuel quantity data information from the control module 100, the injection control module 200 determines the amount of fuel to be supplied by the fuel injection pump to the engine and generates a fuel rack actuator drive signal 2009, which is a pulse width modulated signal that controls the position of the fuel rack by energizing a proportional solenoid. The module 200 produces a signal 2011 which prevents DYNATARD operation when fuel is being injected into the engine. The fuel shut-off signal 2010 provides a safety measure by energizing a solenoid valve to allow fuel to be supplied to the fuel pump. In the case where power is removed from the fuel injection control module, the fuel shut-off signal 2010 will go low to deenergize the solenoid and cut off the flow of fuel.

Figure 4:
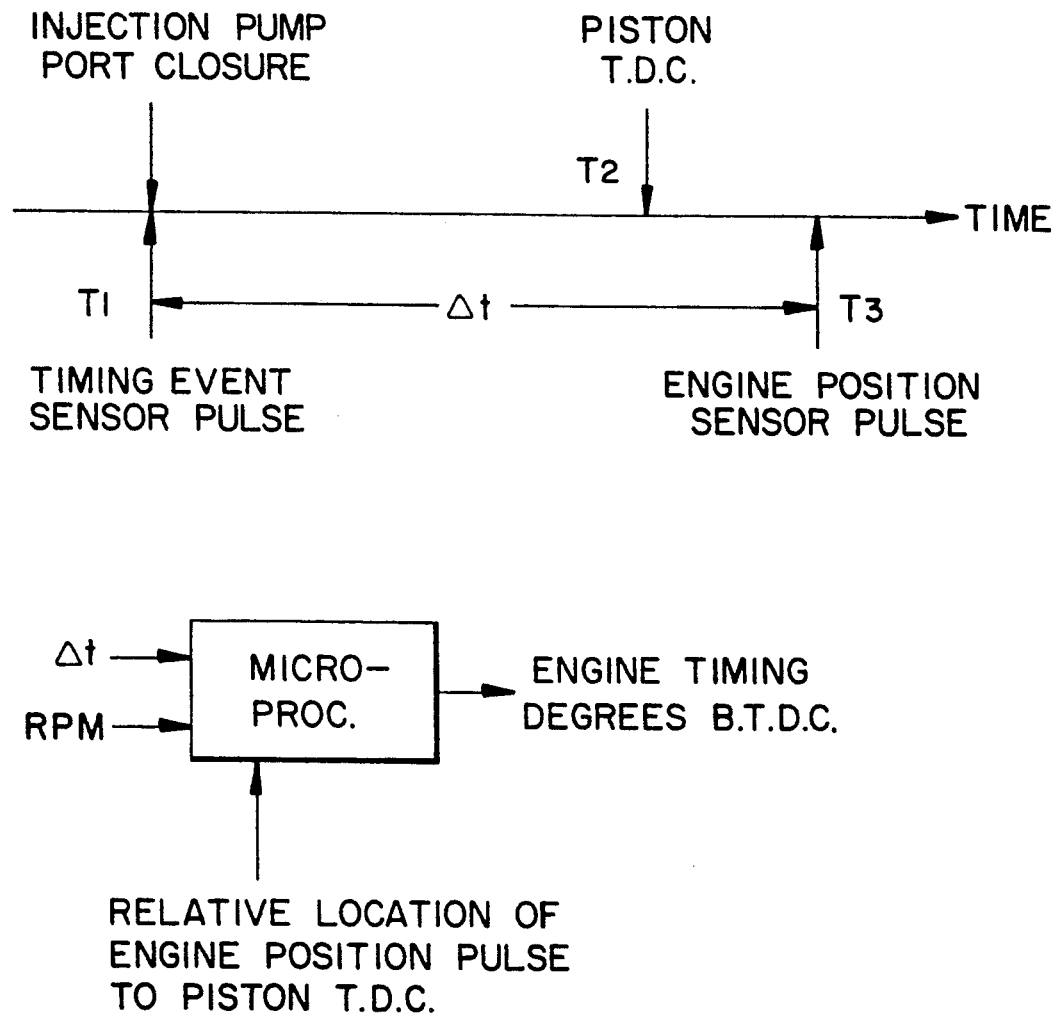
FIG. 4 is a graphical illustration of the calculation of engine timing according to a method of the present invention.
Figure 5:
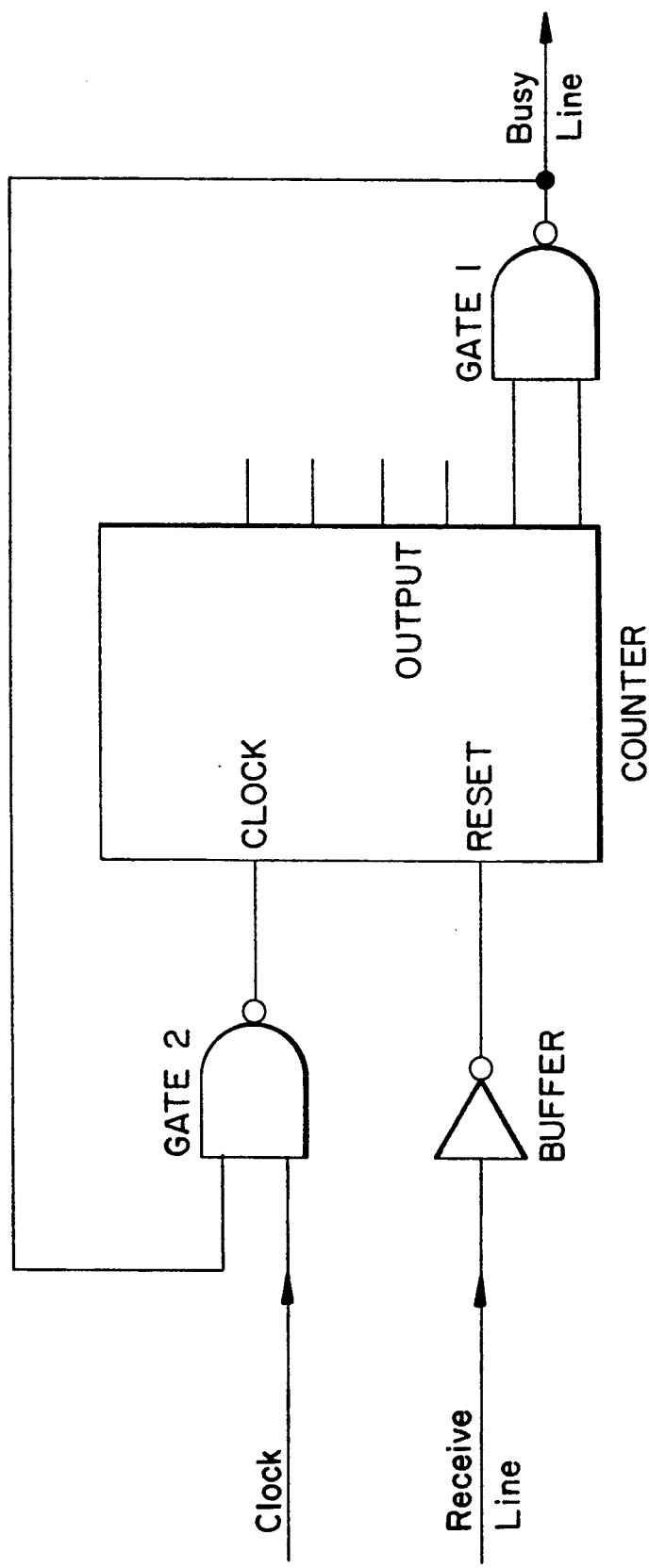
FIG. 5 is a circuit diagram of a detection circuit for detecting the occurrence of data transmission on a serial data communication line as illustration in FIG. 2.

The various functions of the vehicle management and control module 100 will now be described. FIG. 4 illustrates a timing diagram for determining the engine timing. Control module 100 receives a timing event sensor pulse at time $T_1$ which indicates the beginning of fuel injection to a specified cylinder of the engine. At time $T_2$, the engine crankshaft reaches an angular position equal to top dead center (TDC) of the piston in the specified cylinder. The engine position sensor is configured to produce a pulse at a crankshaft position related to the top dead center, which is generally longer than the interval from port closure to top dead center to allow a more accurate timing measurement to be taken. The difference in time $\Delta T$ between the reception of the timing event sensor pulse and the engine position sensor pulse represents a measure of angular rotation of the crankshaft in degrees. Since the time between $T_2$ and $T_3$ is known in advance, the calculation of timing in degrees before top dead center (BTDC) can be calculated.

Desired engine timing is based on experimental criteria related to the amount of fuel being injected and the engine speed in rpm. Desired engine timings as a function of rpm and fuel quantity are stored in a look up table in the module memory. Once the desired engine timing is determined in accordance with the engine speed calculated from the engine position sensor signal and the fuel quantity from the fuel injection control module, the microprocessor determines a change in current for the injection timing actuator signal 103. Signal 103 is provided to a solenoid of a fuel injection timing device which will be described later with reference to FIG. 6. The change in timing is designed to reduce the difference between the desired engine timing and the measured engine timing to zero. The new timing information is communicated to the fuel injection control module via the SAE serial data communication link 10.

Control module 100 constantly monitors engine oil pressure, engine coolant level and coolant temperature to determine whether the engine is operating within prescribed parameter limits. Ranges of oil pressure, coolant level and coolant temperature have been determined empirically to indicate engine malfunction.

These ranges are stored in the control module memory as either single values for all engine operating conditions, or as functions of engine speed, temperature, power output, or other operating parameters. Upon reaching a first limit beyond normal operating parameters, the control module will activate the driver alarm 107 to alert the operator that the engine should be stopped. If the operator has not shut off the engine in response to the alarm, and the signal values have reached a second level beyond normal operating parameters, the control module will transmit a fuel request signal 111 to the fuel injection control module on the data line 20 that will set the amount of fuel being injected to bring the engine to idle speed, and further transmits a command on the SAE serial data link 10 directing the fuel injection control module to stop the engine. A shutdown override switch can be provided on the vehicle instrument panel which, when activated, delays the automatic shutdown of the engine by some preset period of time, such as 30 seconds, to allow the vehicle operator to move the vehicle safely off the road before losing engine power.

The control module 100 monitors vehicle road speed and engine speed in conjunction with information from various switches indicating application of brakes, clutch, and switches mounted on the instrument panel, to maintain vehicle operation within specified limits. These limits, such as minimum and maximum engine speeds and maximum vehicle road speed can be programmed into the control module memory via the SAE serial data communication link from an external computer such as a PC, which can be interfaced with the control module through a serial port connector attached to the data communication link 10. If the control module determines that any modifications are needed to maintain vehicle and engine operation within the prescribed limits, the fuel quantity required to maintain the desired operating parameters is calculated and its value is transmitted as a fuel request signal 111 to the fuel injection control module, with a confirming signal being sent via the SAE data communication link 10.

The control module 100 continuously monitors the validity of all inputs in order to detect invalid input states. Upon detection of an input being outside an acceptable range, the control module starts a timer to allow the state of the input to settle back to normal. If the invalid condition has not cleared upon timing out of the timer, a fault condition will be assumed. Upon detection of a fault, the fault lamp 109 will be turned on to indicate a presence of a fault, and a fault message will be sent on the SAE data link 10 to advise other devices of the failure. The normally utilized data for the fault will be replaced by a "bad data" signal advising other devices to ignore the sensor data. A default value is then utilized for calculations requiring data from the faulty sensor.

The control module 100 also performs a cruise control function in which an operator can set a predetermined vehicle speed through actuation of a switch on the instrument panel which will then cause the control system to adjust fuel injection quantity in order to maintain the desired speed.

Figure 7:
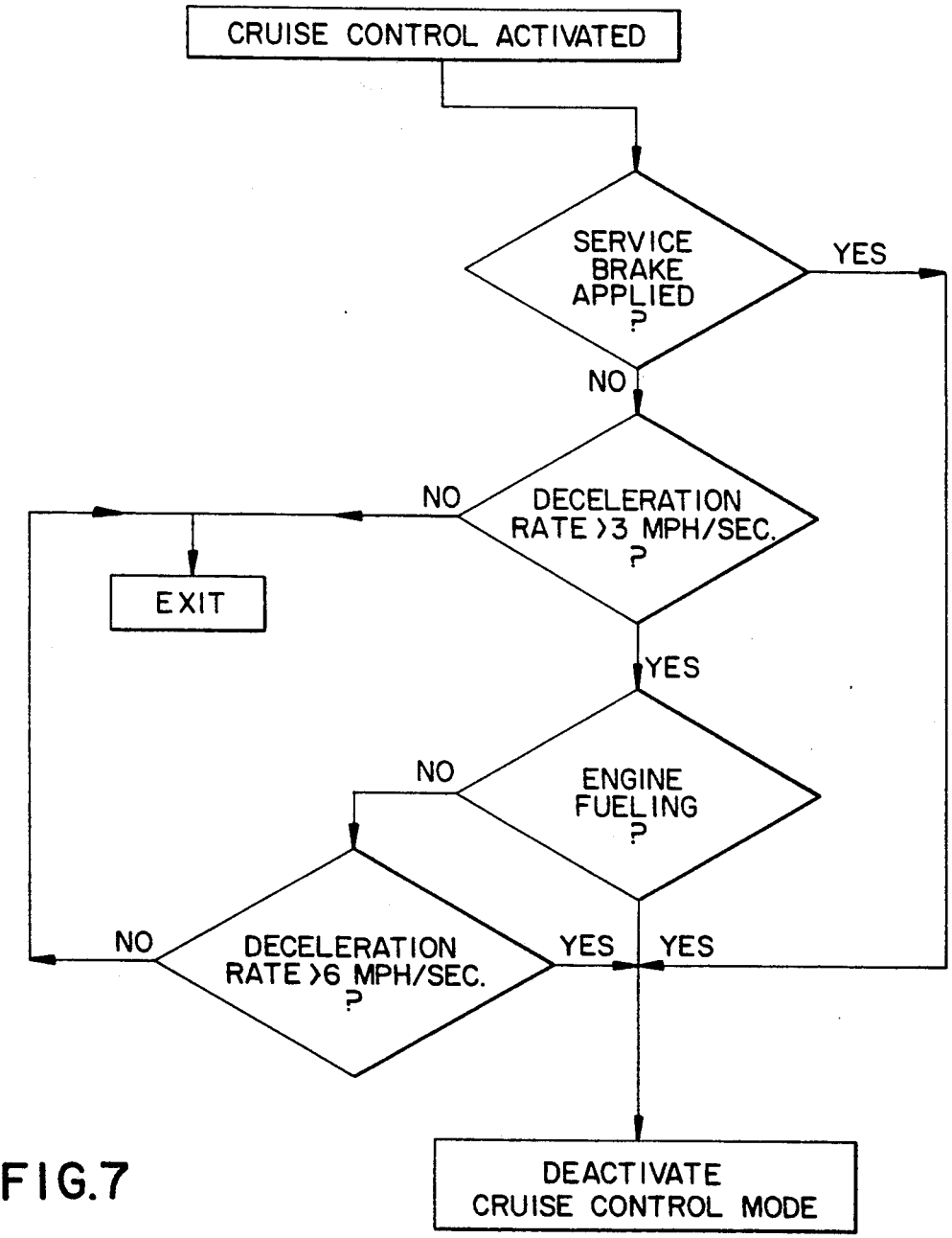
FIG. 7 is a flow chart of a cruise control safety algorithm.

Since the cruise control function must be disengaged upon application of the service brakes to maintain safe operator control of the vehicle, correct operation of the service brake indication switch is continuously monitored. Referring to FIG. 7, when in the cruise control mode, the control system monitors the deceleration rate of the vehicle by calculating the derivative of the vehicle road speed. If the vehicle decelerates at a rate greater than or equal to an empirically derived rate above which it would be impossible to achieve without the application of service brakes, the cruise control function will automatically be disabled. However, since deceleration rates above the derived rate can occur without application of service brakes in certain conditions, such as application of the engine brake or climbing a grade, the control system of the present invention monitors the fuel quantity signal to determine whether fueling of the engine is occurring or not. If, in a cruise control mode, the engine is fueling to maintain a specific speed, it would be impossible to experience a deceleration rate greater than the empirically derived rate of 3 mph/sec, unless the service brakes are applied. In this condition, the cruise control function will be automatically disabled. However, if, in the cruise control mode, the engine is not being fueled, which would be indicative of climbing a grade, the control system will use a deceleration rate higher than the derived rate, such as 6 mph/sec without service brake application, to determine whether the service brake switch has failed.

Figure 8:
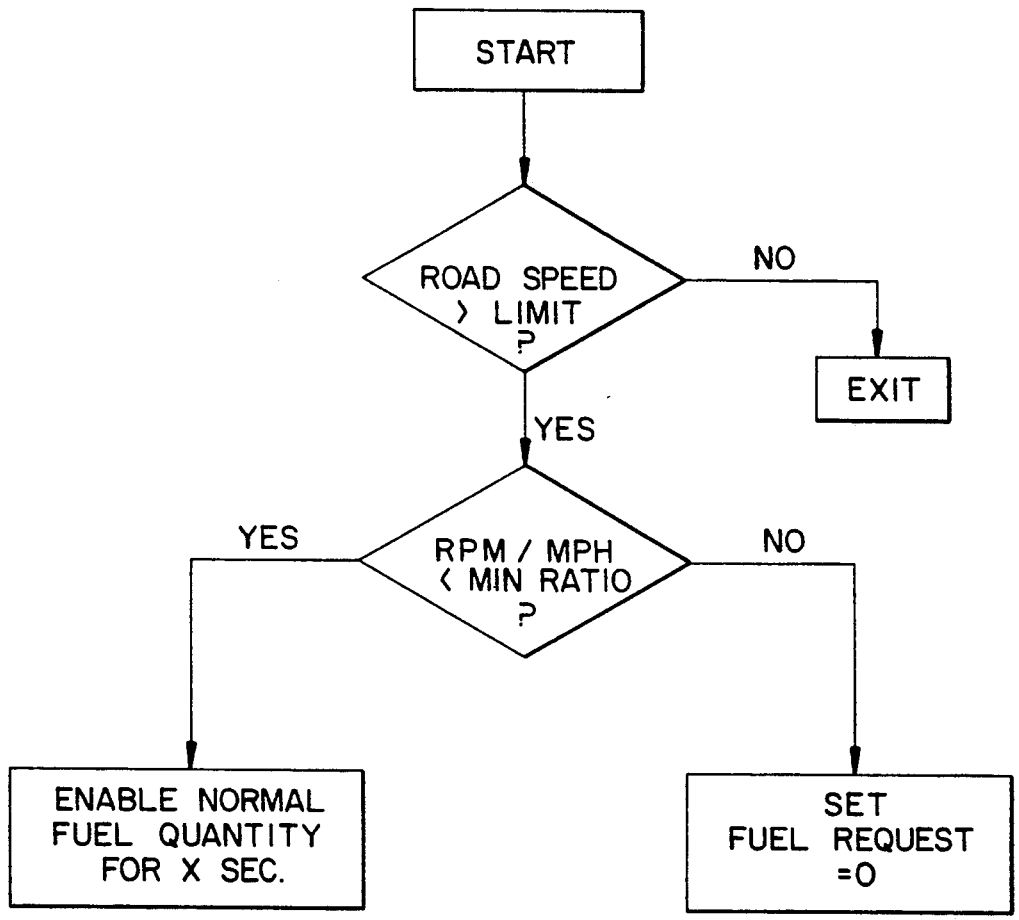
FIG. 8 is a flow chart of an out-of-gear algorithm for road speed governing.

In the case where the control module detects a vehicle road speed above the preset road speed limit, the module generates a fuel request signal which causes the fuel injection control module to stop fueling the engine to insure that the vehicle operator would not be able to exceed the stored limit. It is possible, however, for a loaded vehicle to exceed the stored road speed limit while going down hill. In such a case, the control module would transmit a fuel quantity request signal of zero to disable any additional increase in vehicle speed. If the vehicle transmission should jump out of gear and into neutral at such time, the operator will not be able to fuel the engine to increase engine speed sufficiently to place the transmission back into gear. To eliminate such an occurrence, the control module detects a ratio of engine speed to vehicle road speed and compares this calculated ratio with a prestored minimum engine speed to road speed ratio. FIG. 8 is a flow chart explaining this operation. The minimum stored ratio is determined based on the minimum possible engine rotational speed at the road speed limit. As long as the actual vehicle speed is above the stored road speed limit and the transmission is in gear, the engine speed-to-vehicle speed ratio will be above the stored minimum. However, if the engine speed-to-vehicle speed ratio is below such minimum, the transmission must be out of gear. Upon the occurrence of such a condition, the road speed limiting function will be disabled for a specified period of time to allow the operator to rev up the engine and place the transmission back into gear.

The control routines of FIGS. 7 and 8 are executed as part of a larger overall control loop which is continuously repeated by the control module microprocessor.

Figure 6:
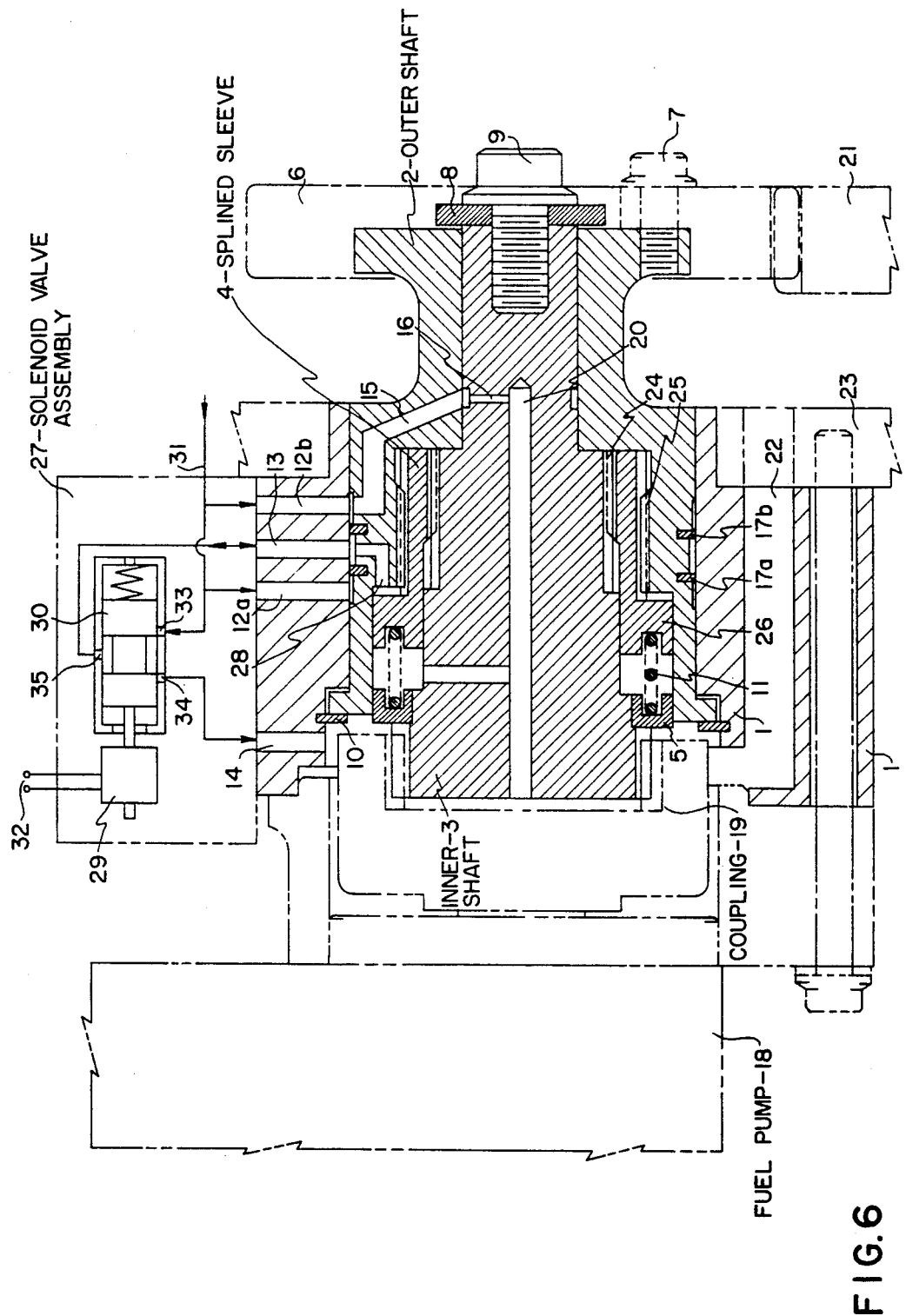
FIG. 6 is a cross-sectional view of a novel fuel injection timing device used in conjunction with the control module of FIG. 2.

FIG. 6 is a cross-sectional diagram of a fuel injection timing device for advancing and retarding the timing of fuel injection to correspond to the desired engine timing represented by the timing actuator signal 103 from the management and control module 100. The fuel injection timing device consists of a housing 1 enclosing, an annular outer shaft 2, a cylindrical inner shaft 3, a splined sleeve 4, and a solenoid valve assembly 27. The housing 1 is mounted on the engine 23. The outer shaft 2 is driven by a suitable engine gear 21 through a gear 6 which is mounted at the end of the shaft 2 by a screw 7. The cylindrical inner shaft 3 is coupled to the outer shaft 2 by the splined sleeve 4. The sleeve 4 has linear splines 24 on the inner surface thereof which mesh with corresponding linear splines on the outer surface of the inner shaft 3. Splined sleeve 4 also has helical splines 25 on the outer surface thereof which mesh with corresponding helical splines on the inner surface of the outer shaft 2. The inner shaft is retained within the outer shaft in the axial direction by means of a thrust washer 8 and a screw 9 at one end thereof. The opposite end of the shaft 3 is coupled to a camshaft of fuel pump 18 through a splined coupling 19 which is mounted on the fuel injection pump camshaft. All moving parts of the timing device are lubricated with engine oil from engine oil supply 31 through ports 12a and 12b in housing 1, port 15 in shaft 2, and ports 16 and 20 in inner shaft 3. Outer shaft 2 is axially retained within housing 1 by means of a shoulder on the shaft and a retaining ring 10.

Solenoid valve assembly 27 is mounted on a top flange of the housing 1 and consists of a solenoid 29, a spool valve 30, input port 33, output port 35, and drain port 34 which is connected to drain port 14. The fuel injection timing actuator signal 103 is coupled to the solenoid 29 via current signal lines 32. The spool valve is shown in a null position which corresponds to a partially energized solenoid, the current required to flow through the partially energized solenoid being null current. At null position, port 33 is partial opened allowing a minimal amount of oil to flow through ports 33 and 35 to compensate for oil leakage out of work space 28. When engine timing is to be advanced, an increased electric current is applied to the solenoid 29 which moves spool valve 30 to the right which enables increased oil flow through supply port 33, output port 35, and modulated oil pressure port 13. This allows increased oil flow into work space 28 between a shoulder of splined sleeve 4 and outer shaft 2 which causes sleeve 4 to move to the left to advance fuel injection timing by advancing the phase angle between the outer shaft 2 and the inner shaft 3. When it is desired to retard engine timing, the fuel injection actuator signal current is reduced below the null level which causes solenoid 29 to move spool valve 30 to the left completely closing supply port 33 and opening drain port 34. As a result, oil in work space 28 flows out through parts 13, 35, and 34 into drain port 14, by action of a spring 11 mounted between piston 26 of sleeve 4 and a spring seat 5 which biases sleeve 4 to the fully retarded position. Any time that the solenoid valve returns to the null position, the sleeve 4 remains in the position where it was last moved. Two piston seal rings 17a and 17b constitute the only dynamic seals used in the injection timing device for sealing the modulated oil pressure in port 13 from the lubricating oil in ports 12a and 12b.

The fuel injection timing device of FIG. 6 allows engine timing to be controlled by a sophisticated injection control algorithm implemented by the management and control module 100 which takes into account numerous operating parameters of the engine and thus represents a significant improvement over prior art fuel injection timing devices which were able to control engine timing as a function of engine speed only.

The invention having been thus described, it will be obvious to those skilled in the art that the same may be varied in many ways. Such variations are not to be considered a departure from the spirit and scope of the invention, all such modifications are intended to be included within the scope of the following claims.

What is claimed is:

1. A management and control system for a motor vehicle, comprising:
  electronic vehicle control means for controlling operations of the vehicle and an engine mounted within said vehicle, including
    means for receiving a timing event signal representing the injection of fuel into a specific cylinder of said engine from a fuel injection pump,
    means for receiving an engine position signal representing a predetermined position of a piston of said specific cylinder relative to Top Dead Center (TDC) occurring after the detection of said timing event signal,
    means for calculating engine timing as a function of the time difference between said engine position signal and said timing event signal,
    means for calculating engine angular velocity as a function of the frequency of said engine position signals,
    means for receiving a fuel quantity signal representing the amount of fuel being injected into the cylinders of said engine,
    means for determining a desired engine timing as a function of said engine angular velocity and said received fuel quantity signal,
    means for calculating the difference between said desired engine timing and said calculated engine timing,
    means for developing a timing advance/retard signal proportional to said calculated difference for advancing or retarding the engine timing to reduce the difference between said desired and calculated engine timings to zero,
    means for receiving an oil pressure signal representing the amount of engine oil pressure in said engine,
    means for receiving a coolant level signal representing the amount of engine coolant in said engine,
    means for receiving a coolant temperature signal representing the temperature of said engine coolant,
    means for comparing said oil pressure, coolant level and coolant temperature signals with stored signal values indicating engine malfunction, generating an alarm signal warning an operator of possible engine damage at a first level of malfunction, and generating an engine shutdown signal for stopping operation of said engine at a second level of malfunction,
    means for receiving a signal proportional to vehicle road speed and calculating the road speed of said vehicle,
    means for storing a maximum vehicle road speed,
    means for storing minimum and maximum engine speeds,
    means for comparing said calculated road speed and engine angular velocity with said stored road and engine speeds,
    means for developing a fuel quantity request signal for controlling the amount of fuel supplied to said engine to keep said road and engine speeds within said stored ranges,
    means for calculating the deceleration rate of said vehicle,
    means for receiving a service brake signal representing application of vehicle service brakes, means for comparing said deceleration rate with said fuel quantity signal in the absence of said service brake signal and disengaging a cruise control function when the rate of deceleration exceeds a first value when fueling, and when the rate of deceleration exceeds a second value higher than said first value when not fueling, means for calculating a ratio of engine speed-to-road speed, means for storing a minimum engine speed-to road speed ratio, and means for comparing said calculated ratio with said stored ratio, determining that the transmission of said vehicle has jumped out of gear when said calculated ratio is less than said stored ratio, and overriding said fuel quantity request signal, when said road speed is higher than said stored maximum road speed;

electronic fuel injection control means for controlling the injection of fuel into the cylinders of said engine, including means for receiving an accelerator pedal position signal representing the position of an accelerator pedal of said vehicle indicating the road speed desired by an operator, means for receiving an engine speed signal representing the angular velocity of said engine, means for receiving a fuel rack position signal representing the position of a fuel rack on a fuel injection pump of said engine, means for receiving said fuel quantity request signal from said electronic vehicle control means, and means for developing a fuel rack actuation signal for controlling the position of said fuel rack to adjust the amount of fuel being injected into said cylinders, in response to the values of said accelerator pedal position signal, engine speed signal, fuel rack position signal, and fuel quantity request signal;

fuel injection timing means responsive to said timing advance/retard signal for modifying the timing of fuel injection into said cylinders relative to piston position from TDC; and a serial data communication line interconnecting said electronic vehicle control means and said electronic fuel injection control means for transmitting digital data therebetween.

2. A management and control system for a motor vehicle according to claim 1, wherein said serial data communication line conforms to SAE (Society of Automotive Engineers) standards for such communication lines, said system further comprising:

a detection circuit for detecting the transmission of data on said serial data communication line, including means for generating a clock pulse signal, counter means for counting said clock pulse signals up to a predetermined count, logic means connected to outputs of said counter means for providing a transmission enable signal and disabling clock pulse signal input when said counter means has reached said predetermined count, and means for resetting said counter means when said serial data communication line is transmitting data.

3. A management and control system for a motor vehicle according to claim 1, further comprising:

a serial data connector coupled to said serial data communication line for interconnecting said serial data communication line with an external data processor to enable imputing of said maximum road speed, said minimum and maximum engine speeds, and values of other parameters used in calculations performed by said electronic vehicle control means.

4. A management and control system for a motor vehicle according to claim 1, wherein said fuel injection timing means comprises:

a cylindrical housing;

an annular outer shaft within said housing being driven by said engine;

a cylindrical inner shaft within said outer shaft being coupled to a camshaft of said fuel injection pump;

a splined sleeve coupling said outer shaft to said inner shaft and movable in an axial direction to change the phase angle of rotation between said outer and inner shafts; and sleeve driving means responsive to said timing advance/retard signal for driving said splined sleeve in said axial direction for modifying the timing of fuel injection to correspond to said desired engine timing.

5. A management and control system for a motor vehicle according to claim 4, wherein said sleeve driving means comprises a solenoid valve assembly including a solenoid for receiving said timing advance/retard signal, a spool valve selectively movable by said solenoid when energized by said timing advance/retard signal, said spool valve controlling the amount of oil pressure applied to said splined sleeve which in turn controls the axial position of said splined sleeve relative to said outer and inner shafts.

6. A management and control system for a motor vehicle, comprising:

electronic vehicle control means for controlling operations of the vehicle and an engine mounted within said vehicle, including means for receiving a signal proportional to vehicle road speed and calculating the road speed of said vehicle, means for calculating the deceleration rate of said vehicle, means for receiving a service brake signal representing application of vehicle service brakes, with a fuel quantity signal in the absence of said service brake signal and disengaging a cruise control function when the rate of deceleration exceeds a first value when fueling, and when the rate of deceleration exceeds a second value higher than said first value when not fueling, means for calculating a ratio of engine speed-to-road speed, means for storing a minimum engine speed-to road speed ratio, and means for comparing said calculated ratio with said stored ratio, determining that the transmission of said vehicle has jumped out of gear when said calculated ratio is less than said stored ratio, and overriding a fuel quantity request signal, when said road speed is higher than said stored maximum road speed.

7. A fuel injection timing device for a fuel injection pump of an internal combustion engine, comprising:

a cylindrical housing;

an annular outer shaft within said housing being driven by said engine;

a cylindrical inner shaft within said outer shaft being coupled to a camshaft of said fuel injection pump;

a splined sleeve coupling said outer shaft to said inner shaft and movable in an axial direction to change the phase angle of rotation between said outer and inner shafts; and sleeve driving means responsive to a timing advance/retard signal for driving said splined sleeve in said axial direction for modifying the timing of fuel injection to correspond to a desired engine timing represented by said timing advance/retard signal.

8. A fuel injection timing device according to claim 7, wherein said sleeve driving means comprises a solenoid valve assembly including a solenoid for receiving said timing advance/retard signal, a spool valve selectively movable by said solenoid when energized by said timing advance/retard signal, said spool valve controlling the amount of oil pressure applied to said splined sleeve which in turn controls the axial position of said splined sleeve relative to said outer and inner shafts.

* * * * *